United States Patent
Zhao et al.

(10) Patent No.: US 11,929,856 B2
(45) Date of Patent: Mar. 12, 2024

(54) NARROWBAND INTERFERENCE ISOLATION METHOD AND COMMUNICATION APPARATUS

(71) Applicant: HUAWEI TECHNOLOGIES CO., LTD., Guangdong (CN)

(72) Inventors: Yanbo Zhao, Shenzhen (CN); Jianfei Liu, Wuhan (CN); Jinshan Wang, Wuhan (CN); Yanbin Sun, Wuhan (CN); Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/986,485

(22) Filed: Nov. 14, 2022

(65) Prior Publication Data

US 2023/0076665 A1 Mar. 9, 2023

Related U.S. Application Data

(63) Continuation of application No. PCT/CN2020/090583, filed on May 15, 2020.

(51) Int. Cl.
*H04L 27/26* (2006.01)
(52) U.S. Cl.
CPC ..................... *H04L 27/26* (2013.01)
(58) Field of Classification Search
CPC ....................................................... H04L 27/26
See application file for complete search history.

(56) References Cited

U.S. PATENT DOCUMENTS

| 9,716,529 B1 | 7/2017 | Dai et al. |
| 2007/0076722 A1 | 4/2007 | Ungerboeck et al. |

(Continued)

FOREIGN PATENT DOCUMENTS

| CN | 102055530 A | 5/2011 |
| CN | 102404271 A | 4/2012 |

(Continued)

OTHER PUBLICATIONS

Feng et al., "An Improved Narrow-band Interference Estimation Method," Electronic Collection of the Fifth China Satellite Navigation Academic Annual Conference, May 21, 2014, 8 pages (with an English abstract).

(Continued)

*Primary Examiner* — Janice N Tieu
(74) *Attorney, Agent, or Firm* — Fish & Richardson P.C.

(57) ABSTRACT

This application provides a narrowband interference isolation method and a communication apparatus. An example method includes: determining a parameter of a narrowband interference signal; determining a coefficient of a first filter based on the parameter of the narrowband interference signal, wherein the first filter is located at a receive end of a master communication device, and the coefficient of the first filter is for filtering out the narrowband interference signal; and sending the parameter of the narrowband interference signal or the coefficient of the first filter to M slave communication devices using an Ethernet operation, administration, and maintenance (OAM) frame, wherein the master communication device is connected to the M slave communication devices, $M \geq 1$, and M is an integer.

17 Claims, 12 Drawing Sheets

(56) References Cited

U.S. PATENT DOCUMENTS

| | | | |
|---|---|---|---|
| 2011/0103459 A1* | 5/2011 | Esmailian | H04L 25/03057 375/233 |
| 2012/0331136 A1* | 12/2012 | Kanai | H04L 43/10 709/224 |
| 2013/0072143 A1 | 3/2013 | Dabiri | |
| 2014/0079107 A1 | 3/2014 | Abdelmonem et al. | |

FOREIGN PATENT DOCUMENTS

| | | |
|---|---|---|
| CN | 103248395 A | 8/2013 |
| CN | 108649999 A | 10/2018 |
| EP | 2320613 A2 | 5/2011 |

OTHER PUBLICATIONS

Extended European Search Report in European Appln No. 20935268.1, dated Apr. 24, 2023, 7 pages.

International Search Report and Written Opinion in International Appln. No. PCT/CN2020/090583, dated Feb. 22, 2021, 17 pages (with English translation).

* cited by examiner

NARROWBAND INTERFERENCE ISOLATION METHOD AND COMMUNICATION APPARATUS

CROSS-REFERENCE TO RELATED APPLICATIONS

This application is a continuation of International Application No. PCT/CN2020/090583, filed on May 15, 2020. The disclosure of which is hereby incorporated by reference in its entirety.

TECHNICAL FIELD

This application relates to the communications field, and specifically, to a narrowband interference isolation method and a communication apparatus.

BACKGROUND

An interference signal such as electromagnetic interference (electromagnetic interference, EMI) usually includes a narrowband signal centered on one or more frequencies. The frequency may be as low as a few MHz or as high as a few GHz. A broadcast transmitting station, aeronautical communication, a civil walkie-talkie, a wireless charging pile, and a communication base station are all examples of devices that generate the EMI that impedes communication. Such a signal is instantaneous and may cause link drop (link drop) or an unacceptable bit error rate (bit error rate, BER) in a communication system. For example, a 10GBASE-T system is sensitive to an EMI signal with a frequency in an operating band ((0,4001) of the 10GBASE-T system. The 10GBASE-T system is more sensitive to the EMI because in the 10GBASE-T system, communication channels between a link and a link partner usually operate very close to a channel capacity to obtain a high data rate. If the EMI suddenly occurs, these sensitive channels will degrade quality of a communication link between the link and the link partner.

When narrowband interference in the communication link is processed, only single-link parameter passing is considered in a conventional method. For a point-to-multipoint topology communication system, this single-ended or single-link processing mode wastes a large quantity of storage space and calculation power.

SUMMARY

This application provides a communication method and a communication apparatus, so that a plurality of slave communication devices do not need to repeatedly perform interference estimation when performing interference isolation, to save storage space and calculation power of the slave communication devices.

According to a first aspect, a narrowband interference isolation method is provided. The method is applied to an Ethernet system and includes: determining a parameter of a narrowband interference signal; determining a coefficient of a first filter based on the parameter of the narrowband interference signal, where the first filter is located at a receive end of a master communication device, and the coefficient of the first filter is for filtering out the narrowband interference signal; and sending the parameter of the narrowband interference signal or the coefficient of the first filter to M slave communication devices using an Ethernet operation, administration, and maintenance OAM frame, where the master communication device is connected to the M slave communication devices, M≥1, and M is an integer.

In the foregoing technical solution, the master communication device sends the determined interference parameter or filter coefficient to a plurality of slave communication devices using an interaction capability specific to the Ethernet OAM frame. In this way, the plurality of slave communication devices each can construct a filter at a receive end of each of the plurality of slave communication devices based on received information, and do not need to repeatedly perform interference estimation, so that storage space and calculation power of the slave communication devices are saved.

In addition, the master communication device and the slave communication device can ensure link communication quality in a case of strong narrowband interference using the constructed filter.

With reference to the first aspect, in some implementations of the first aspect, before the sending the parameter of the narrowband interference signal or the coefficient of the first filter to M slave communication devices, the method further includes: sending an emergency mode entering request message to the M slave communication devices using a first bit in the OAM frame, where the first bit is a reserved bit in the OAM frame.

In the foregoing technical solution, the master communication device sends an emergency mode entering request to the slave communication device, and after receiving the request, the slave communication device may construct, based on a corresponding parameter, a corresponding filter at the receive end, to filter out an interference signal at a specific frequency.

With reference to the first aspect, in some implementations of the first aspect, an emergency mode entering acknowledgment message sent by the M slave communication devices is received using a second bit in the OAM frame.

In the foregoing technical solution, by receiving an emergency mode entering acknowledgment sent by the slave communication device, the master communication device can learn whether the slave communication device has successfully constructed the filter.

With reference to the first aspect, in some implementations of the first aspect, a difference between a first input signal and a first output signal that pass through the first filter is calculated, and whether the narrowband interference signal still exists is determined based on the difference.

Optionally, when a difference between an input signal and an output signal of the first filter is less than a threshold, it is determined that the narrowband interference signal does not exist. When the narrowband interference signal exists, a second input signal that is received is filtered using the first filter, or when the narrowband interference signal does not exist, a second input signal that is received is not filtered using the first filter, where the second input signal is a signal received after the first input signal is received.

In the foregoing technical solution, a master communication device can determine, based on the difference between the input signal and the output signal of the filter, whether the interference signal still exists. Specifically, if the difference between the input signal and the output signal of the filter is large, it indicates that the filter filters out the interference signal at the specific frequency. If the difference between the input signal and the output signal is small, it indicates that the interference signal at the specific frequency does not exist in the output signal. In this case, the difference between the input signal and the output signal is very small, and basically does not change. When the specific interference signal does not exist, an input signal received by the master communication device is not filtered using the constructed filter any more.

With reference to the first aspect, in some implementations of the first aspect, when the narrowband interference signal does not exist, the method further includes: sending an emergency mode exiting request message to the M slave communication devices using the first bit in the OAM frame.

In the foregoing technical solution, when it is determined that the specific interference signal does not exist, the master communication device notifies, using an emergency mode exiting request, all slave communication devices not to perform filtering using the constructed filter any more.

With reference to the first aspect, in some implementations of the first aspect, an emergency mode exiting acknowledgment message sent by the M slave communication devices is received using the second bit in the OAM frame, where the second bit is another reserved bit different from the first bit in the OAM frame.

In the foregoing technical solution, by receiving the emergency mode exiting acknowledgment messages sent by all slave communication devices, the master communication device can learn whether the slave communication devices have successfully exited an emergency mode.

According to a second aspect, a narrowband interference isolation method is provided. The method is applied to an Ethernet system and includes: A slave communication device receives a parameter of a narrowband interference signal or a coefficient of a first filter from a master communication device using an Ethernet operation, administration, and maintenance OAM frame, where the coefficient of the first filter is determined by the master communication device based on the parameter of the narrowband interference signal, the coefficient of the first filter is for filtering out the narrowband interference signal, the master communication device is connected to M slave communication devices, the slave communication device is any one of the M slave communication devices, $M \geq 1$, and M is an integer; and determines a coefficient of a second filter based on the parameter of the narrowband interference signal or the coefficient of the first filter, where the second filter is located at a receive end of the slave communication device, and the coefficient of the second filter is for filtering out the narrowband interference signal.

In the foregoing technical solution, the slave communication device receives, using an interaction capability specific to the Ethernet OAM frame, the interference parameter or filter coefficient sent by the master communication device, and a plurality of slave communication devices each construct a filter at a receive end of each of the plurality of slave communication devices based on received information. In this way, the plurality of slave communication devices do not need to repeatedly perform interference estimation, so that storage space and calculation power of the slave communication devices are saved. In addition, the slave communication device can ensure link communication quality in a case of strong narrowband interference using the constructed filter.

With reference to the second aspect, in some implementations of the second aspect, before that a slave communication device receives a parameter of a narrowband interference signal or a coefficient of a first filter from a master communication device, the method further includes: receiving, using a first bit in the OAM frame, an emergency mode entering request message sent by the master communication device.

In the foregoing technical solution, after receiving the emergency mode entering request message, the slave communication device may construct, based on a corresponding parameter, a corresponding filter at the receive end, to filter out an interference signal at a specific frequency.

With reference to the second aspect, in some implementations of the second aspect, the method further includes: sending an emergency mode entering acknowledgment message to the master communication device using a second bit in the OAM frame.

In the foregoing technical solution, the slave communication device sends an emergency mode entering acknowledgment to the master communication device, so that the master communication device can learn whether the slave communication device has successfully constructed the filter.

With reference to the second aspect, in some implementations of the second aspect, the method further includes: receiving, using the first bit in the OAM frame, an emergency mode exiting request message sent by the master communication device; and skipping filtering, based on the emergency mode exiting request message using the second filter, an input signal received after the emergency mode exiting request message is received.

In the foregoing technical solution, the master communication device notifies, using an emergency mode exiting request, all slave communication devices that the interference signal at the specific frequency does not exist and not to filter a received signal using the constructed filter any more.

With reference to the second aspect, in some implementations of the second aspect, the method further includes: sending an emergency mode exiting acknowledgment message using the second bit in the OAM frame.

In the foregoing technical solution, by sending the emergency mode exiting acknowledgment message to the master communication device, the slave communication device notifies the master communication device whether the slave communication device has successfully exited an emergency mode.

According to a third aspect, a communication apparatus is provided. The communication apparatus has a function of implementing the method according to the first aspect or any one of the possible implementations of the first aspect. The function may be implemented by hardware, or may be implemented by hardware executing corresponding software. The hardware or the software includes one or more units corresponding to the foregoing function.

According to a fourth aspect, a communication apparatus is provided in this application. The communication apparatus has a function of implementing the method according to the second aspect or any one of the possible implementations of the second aspect. The function may be implemented by hardware, or may be implemented by hardware executing corresponding software. The hardware or the software includes one or more units corresponding to the foregoing function.

According to a fifth aspect, this application provides a communication device, including at least one processor. The at least one processor is coupled to at least one memory, the at least one memory is configured to store a computer program or instructions, and the at least one processor is configured to invoke the computer program or the instructions from the at least one memory and run the computer program or the instructions, so that the communication device performs the method according to the first aspect or any one of the possible implementations of the first aspect.

In an example, the communication device may be a master communication device in a point-to-multipoint topology communication system.

According to a sixth aspect, this application provides a communication device, including at least one processor. The at least one processor is coupled to at least one memory, the at least one memory is configured to store a computer program or instructions, and the at least one processor is configured to invoke the computer program or the instructions from the at least one memory and run the computer program or the instructions, so that the communication device performs the method according to the second aspect or any one of the possible implementations of the second aspect.

In an example, the communication device may be a slave communication device in a point-to-multipoint topology communication system.

According to a seventh aspect, this application provides a computer-readable storage medium. The computer-readable storage medium stores computer instructions. When the computer instructions are run on a computer, the method according to the first aspect or any one of the possible implementations of the first aspect is performed.

According to an eighth aspect, this application provides a computer-readable storage medium. The computer-readable storage medium stores computer instructions. When the computer instructions are run on a computer, the method according to the second aspect or any one of the possible implementations of the second aspect is performed.

According to a ninth aspect, this application provides a computer program product. The computer program product includes computer program code. When the computer program code is run on a computer, the method according to the first aspect or any one of the possible implementations of the first aspect is performed.

According to a tenth aspect, this application provides a computer program product. The computer program product includes computer program code. When the computer program code is run on a computer, the method according to the second aspect or any one of the possible implementations of the second aspect is performed.

According to an eleventh aspect, this application provides a chip, including a processor and a communication interface. The communication interface is configured to receive a signal and transmit the signal to the processor. The processor processes the signal, so that the method according to the first aspect or any one of the possible implementations of the first aspect is performed.

According to a twelfth aspect, this application provides a chip, including a processor and a communication interface. The communication interface is configured to receive a signal and transmit the signal to the processor. The processor processes the signal, so that the method according to the second aspect or any one of the possible implementations of the second aspect is performed.

According to a thirteenth aspect, this application provides a communication system, including the communication device described in the fifth aspect and the sixth aspect.

Figure 4:
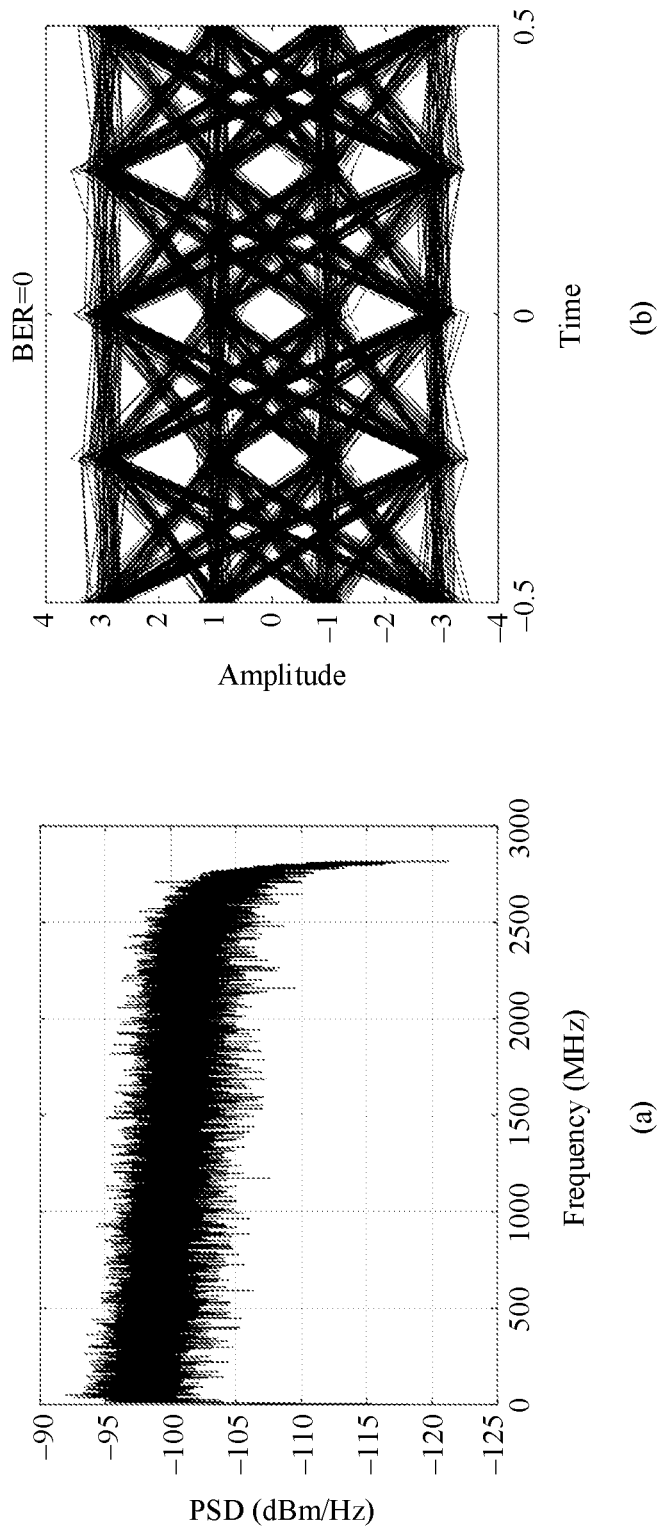
Figure 5:
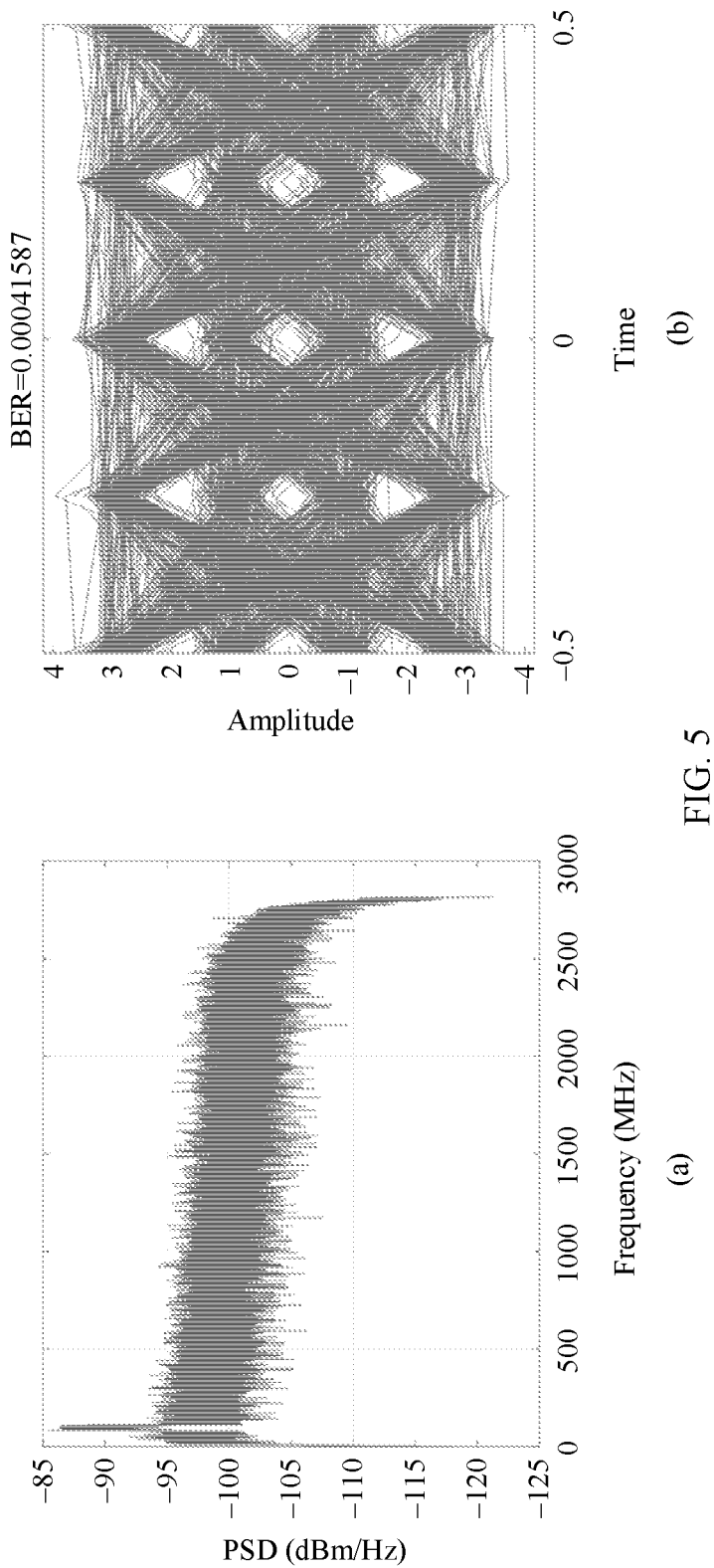
Figure 6:
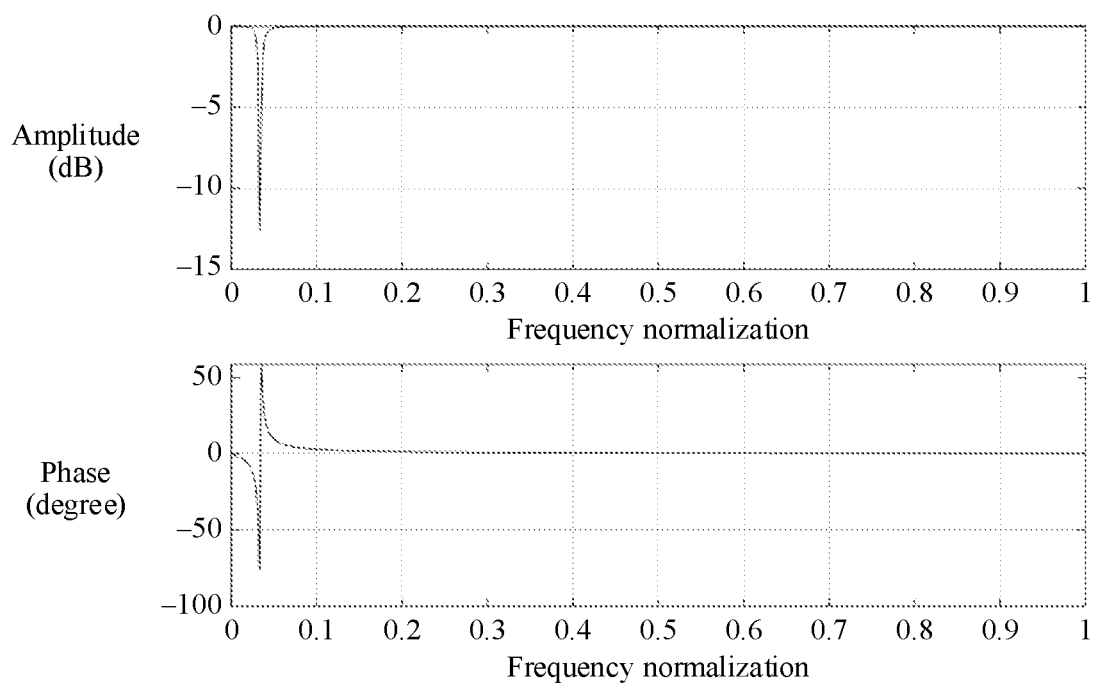
Figure 7:
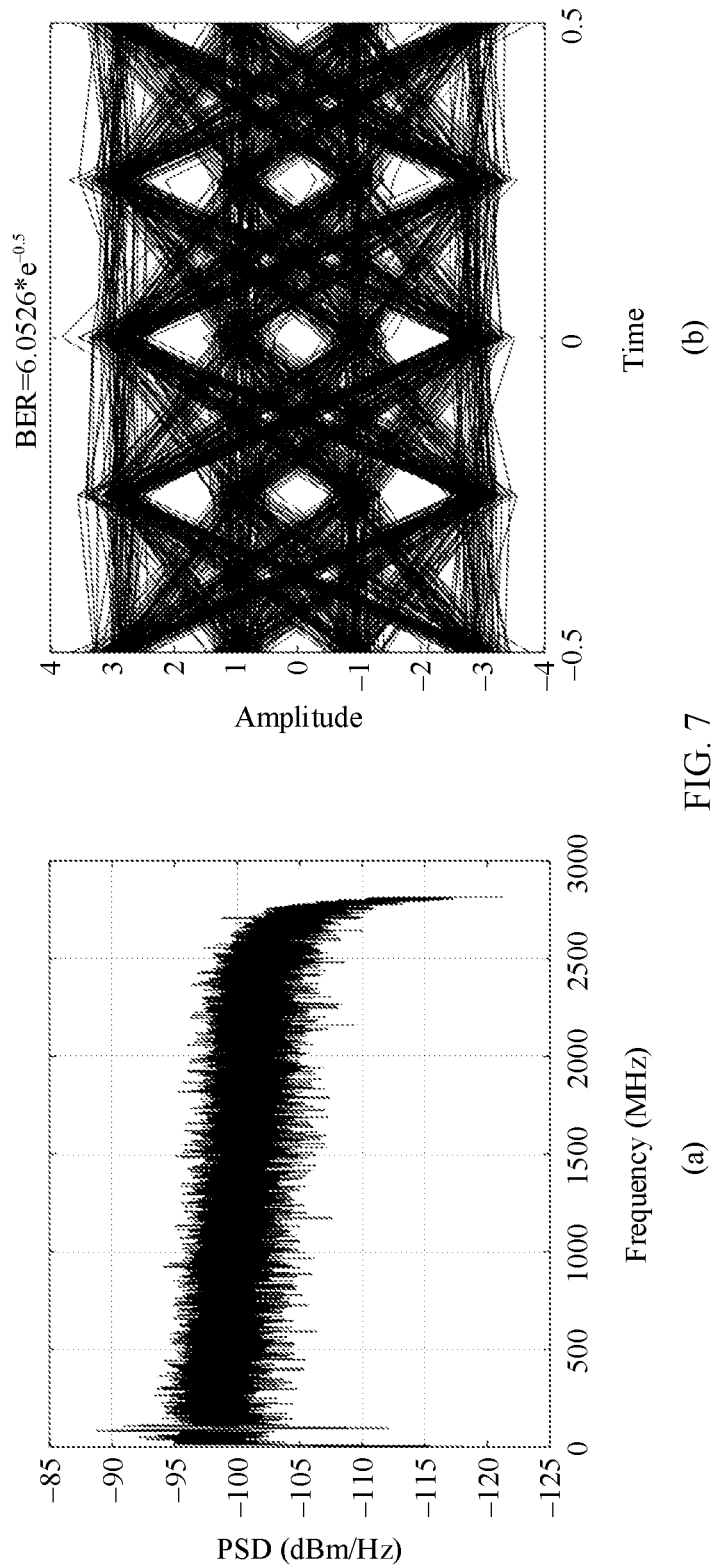
Figure 8:
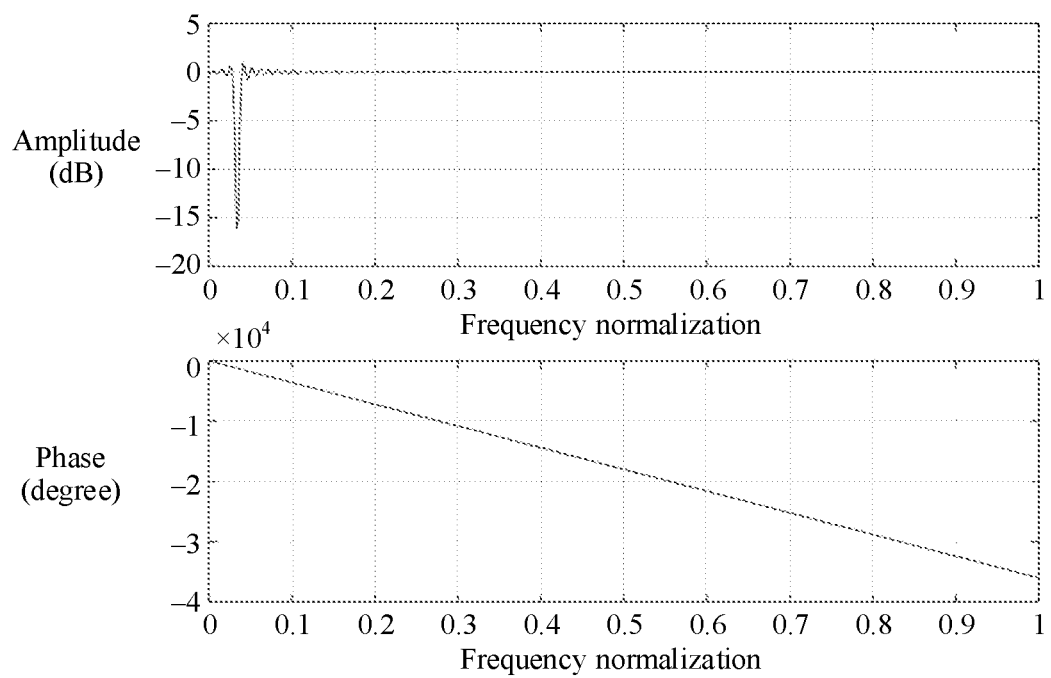
Figure 9:
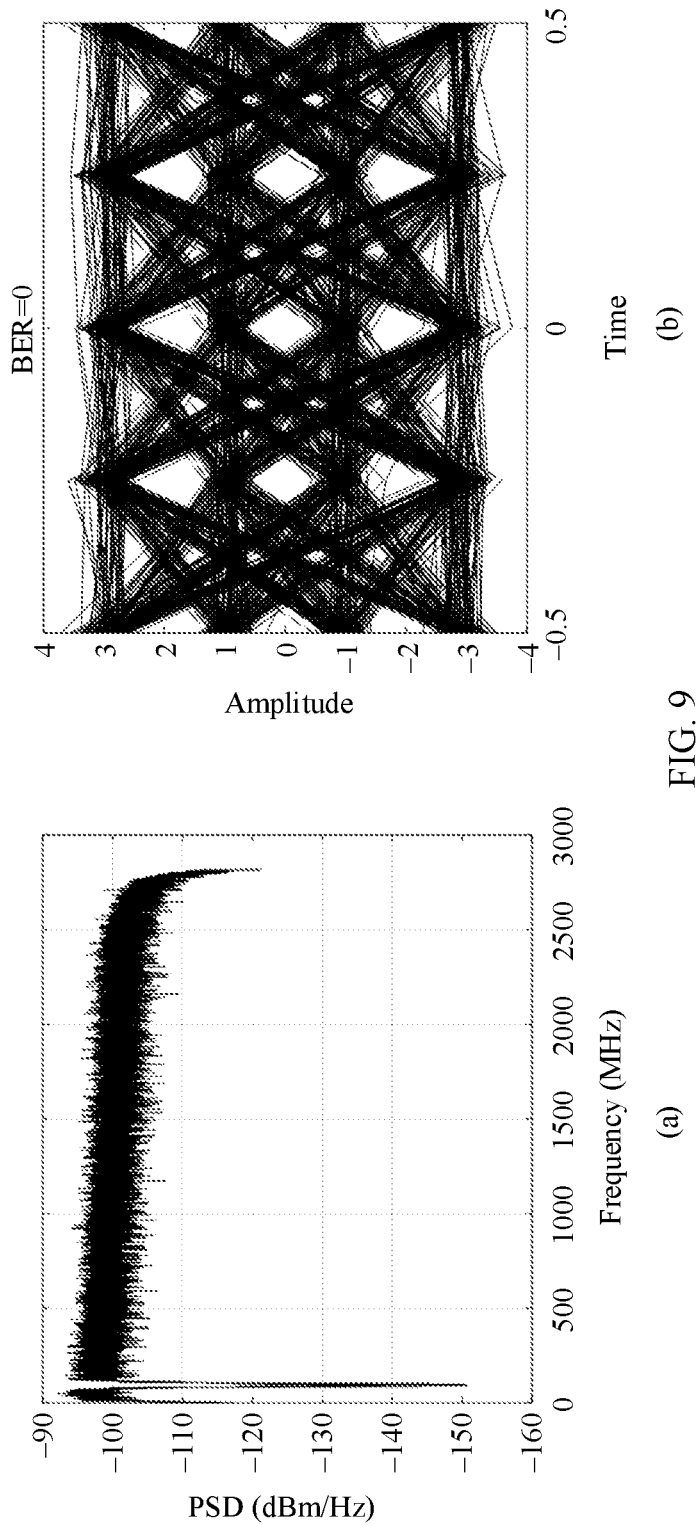
Figure 10:
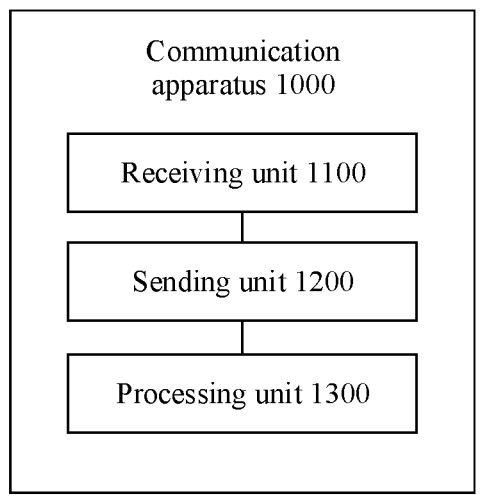
Figure 11:
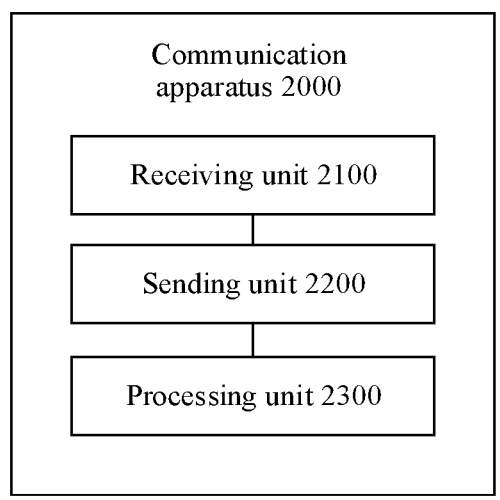
Figure 12:
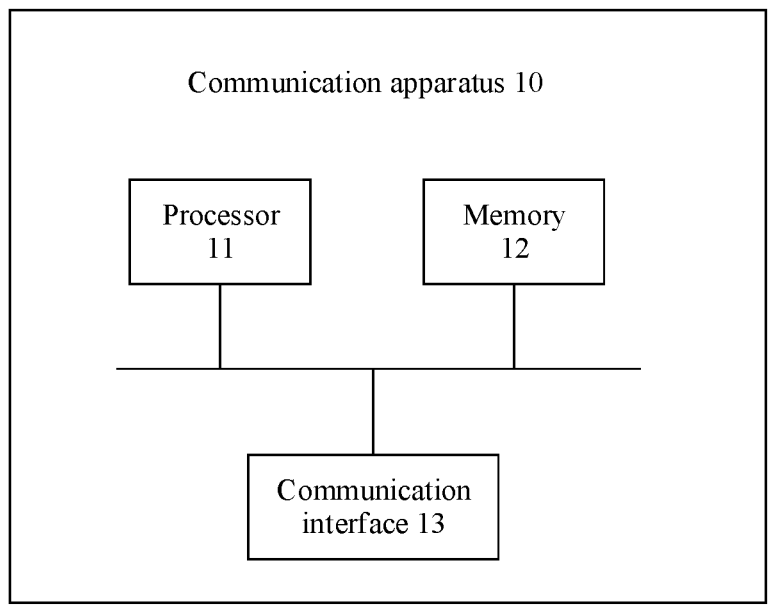
Figure 13:
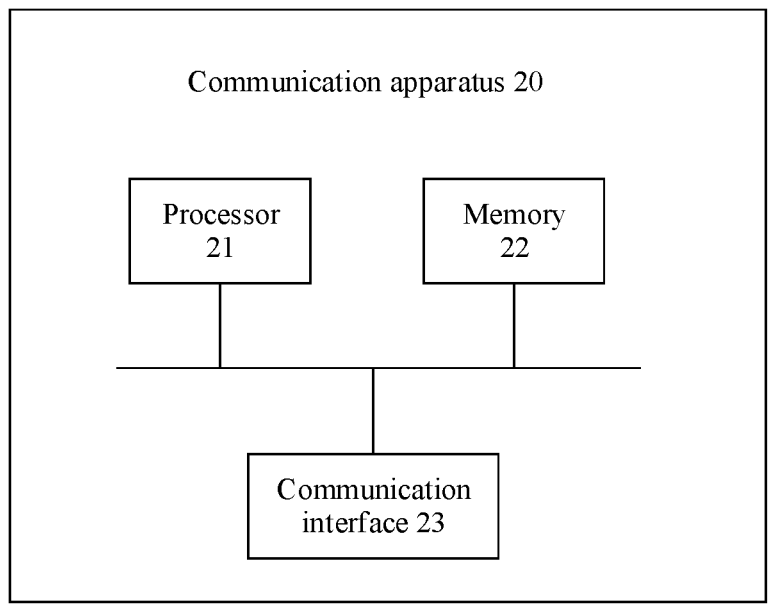

(a) in FIG. 4 is a PSD simulation drawing obtained when narrowband interference does not exist in a received signal of a vehicle;

(b) in FIG. 4 is an eye diagram obtained through DFE equalization when narrowband interference does not exist in a received signal of a vehicle;

(a) in FIG. 5 is a PSD simulation drawing that is of a received signal and that is obtained when narrowband interference with a center frequency of 100 MHz exists in the received signal of a vehicle;

(b) in FIG. 5 is an eye diagram that is of a received signal and that is obtained through DFE equalization when narrowband interference with a center frequency of 100 MHz exists in the received signal of a vehicle;

FIG. 6 is simulation drawings of an amplitude-frequency response and a phase-frequency response of an IIR filter;

(a) in FIG. 7 is a PSD simulation result of an output signal obtained after a received signal passes through an IIR filter;

(b) in FIG. 7 is a simulation result of an eye diagram obtained through equalization after a received signal passes through an IIR filter;

FIG. 8 is simulation drawings of an amplitude-frequency response and a phase-frequency response of an FIR filter;

(a) in FIG. 9 is a PSD simulation result of an output signal obtained after a received signal passes through an FIR filter;

(b) in FIG. 9 is a simulation result of an eye diagram obtained through equalization after a received signal passes through an FIR filter;

FIG. 10 is a schematic block diagram of a communication apparatus 1000 according to this application;

FIG. 11 is a schematic block diagram of a communication apparatus 2000 according to this application;

FIG. 12 is a schematic diagram of a structure of a communication apparatus 10 according to this application; and FIG. 13 is a schematic diagram of a structure of a communication apparatus 20 according to this application.

DESCRIPTION OF EMBODIMENTS

The following describes technical solutions of this application with reference to accompanying drawings.

The technical solutions in embodiments of this application may be applied to various communication systems, for example, a long term evolution (long term evolution, LTE) system, a 5th generation (5th generation, 5G) system, a communication system after 5G, vehicle-to-X (vehicle-to-X, V2X), long term evolution-vehicle (long term evolution-vehicle, LTE-V), an internet of vehicles, machine type communication (machine type communication, MTC), an internet of things (internet of things, IoT), long term evolution-machine (long term evolution-machine, LTE-M), machine to machine (machine to machine, M2M), and the like, where the V2X may include vehicle-to-network (vehicle-to-network, V2N), vehicle-to-vehicle (vehicle-to-vehicle, V2V), and vehicle-to-infrastructure (vehicle-to-infrastructure, V2I), vehicle-to-pedestrian (vehicle-to-pedestrian, V2P), and the like.

Figure 1:
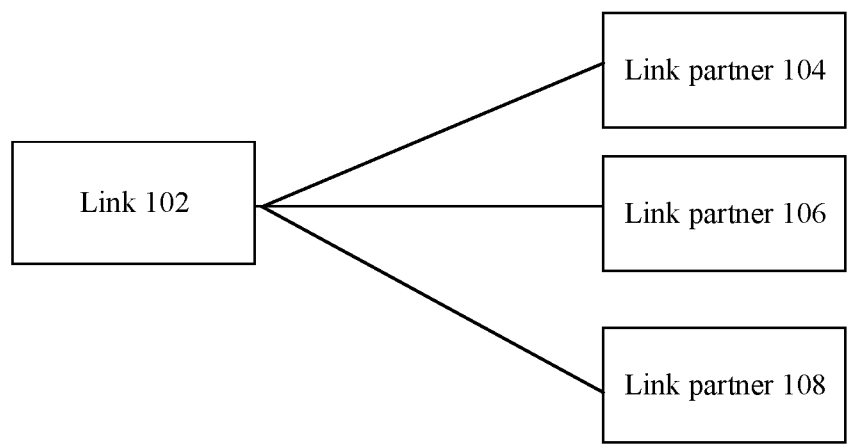
FIG. 1 shows a point-to-multipoint topology communication system 100.

FIG. 1 shows a point-to-multipoint topology communication system 100. The communication system 100 includes a link 102 and a plurality of link partners connected through wire pairs, for example, a link partner 104, a link partner 106, and a link partner 108. The link 102, the link partner 104, the link partner 106, and the link partner 108 are all a part of an Ethernet system. The term "link partner" represents a device at the other end of a communication link. For example, the link 102 is a "link partner" of the link partner 104, and the link partner 104 is a "link partner" of the link 102.

The link partner in embodiments of this application may be referred to as user equipment, an access terminal, a subscriber unit, a subscriber station, a mobile station, a mobile station, a remote station, a remote terminal, a mobile device, a user terminal, a terminal, a wireless communication device, a user agent, a user apparatus, or the like. The link partner may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in another communication system, or the like. This is not limited in embodiments of this application.

It should be understood that, in an in-vehicle scenario, the foregoing point-to-multipoint topology communication system is usually a topology structure in which a gateway (that is, an example of a master communication device) is connected to a plurality of communication modules (that is, an example of a slave communication device). For example, the plurality of communication modules include sensors such as a camera and radar. It may be understood that the link 102 in FIG. 1 may be a gateway, and the link partner 104 may be a sensor such as a camera or radar.

An in-vehicle Ethernet is developing toward a high speed. In the IEEE 802.3ch standard, a maximum communication rate of 10 Gbps is supported. In these related standards, single-carrier pulse amplitude modulation (pulse amplitude modulation, PAM) that is easy to implement is generally used. For example, PAM-4 is used in a 10 Gbps scenario, channel bandwidth is about 2.8 GHz, and communication performance of a link is restricted by a signal-to-noise ratio (signal-to-noise ratio, SNR) of an entire application frequency band.

A twisted-pair copper cable is used as a transmission medium in the in-vehicle Ethernet. This is susceptible to electromagnetic noise interference. Due to process and cost constraints, poor cable shielding may cause the communication performance to be polluted by external high-power narrowband signals such as an FM broadcast transmitting station, aeronautical communication, a civil walkie-talkie, a wireless charging pile, and a communication base station. When a vehicle passes through these areas, severe narrowband interference may increase a bit error rate between communication link partners, or even cause frequent link disconnection and reconnection. This poses a great risk to normal and stable running of the vehicle. Therefore, in a large-bandwidth and ultra-high-speed in-vehicle Ethernet scenario, electromagnetic susceptibility (electromagnetic susceptibility, EMS) capabilities of all communication devices in the vehicle need to be further ensured.

In some existing EMI cancellation methods, it is determined, by performing slicing analysis on a signal, that narrowband interference exists, and then a noise parameter is estimated in two steps: rough estimation and fine estimation, to generate a prediction signal to cancel narrowband interference noise. A narrowband interference cancellation circuit includes an operation unit and a storage unit required for the rough and fine estimation of the noise parameter, and a forward error correction (forward error correction, FEC) coder decoder circuit. However, the circuit has a complex structure, and has a high requirement on a calculation capability and a storage capability of a link partner. Practical operation is difficult. In the in-vehicle scenario, the plurality of communication modules include sensors such as a camera and radar. If the communication modules are required to have the calculation capability and the storage capability of the foregoing circuit and a corresponding hardware condition, costs and power consumption are inevitably increased.

In another method in which electromagnetic interference (electromagnetic interference, EMI) information can be notified to a link partner, when a link partner 1 detects that the EMI exists, a feed forward equalizer (feed forward equalizer, FFE) coefficient and a decision feedback equalizer (decision feedback equalizer, DFE) coefficient that correspond to an interference frequency range are notified to a link partner 2 using a housekeeping bit in a low-density parity-check (low-density parity-check, LDPC) code block, and the link partner 2 correspondingly adjusts a filter coefficient to cancel EMI impact in a received signal. A process of transferring the EMI information to the link partner is introduced into the method. In this process, housekeeping bits of several consecutive low-density parity-check (low-density parity-check code, LDPC) codewords need to be changed to form an indication frame, and then a modulation method is changed to PAM-2. An encoded DFE coefficient is repeatedly sent to the link partner for several times, or sent to the link partner using a high-level data link control (high-level data link control, HDLC) protocol of a data link layer. However, implementation of the method requires the FEC codewords and a PAM modulation order to be changed, and an encoding policy of a physical layer transmission coefficient or an upper-layer HDLC related protocol to be adjusted. This increases complexity of system implementation.

In view of this, this application provides a simple and effective narrowband interference isolation method based on a topology feature of an Ethernet, to save storage space and calculation power of a link partner without changing an FEC solution and a hardware structure in an existing standard specification.

It should be understood that embodiments provided in this application may be applied to an in-vehicle Ethernet, or may be applied to another communication scenario having a point-to-multipoint topology and an interaction capability, for example, an industrial Ethernet or a data center Ethernet.

Figure 2:
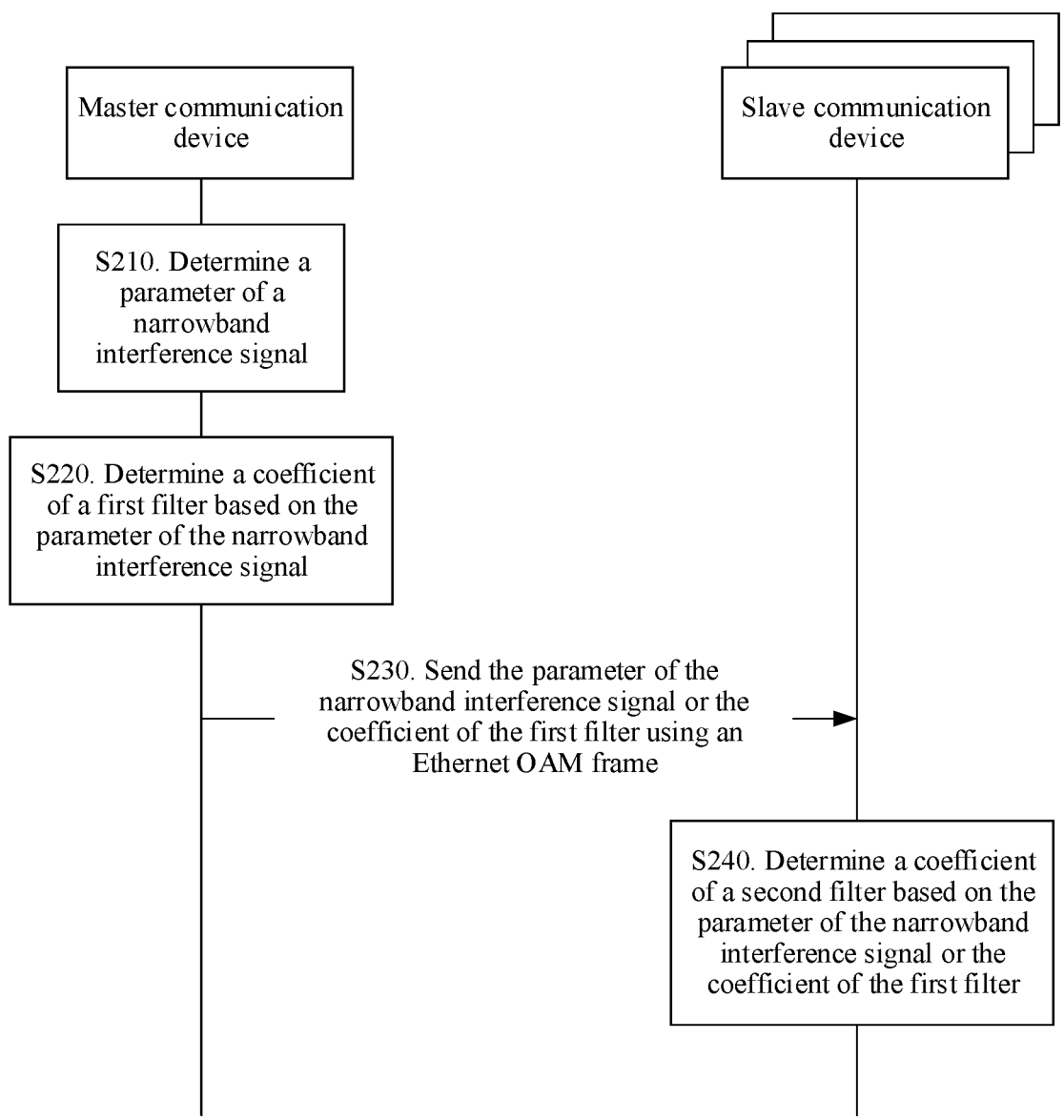
FIG. 2 is a schematic diagram of a narrowband interference isolation method according to an embodiment of this application.

FIG. 2 is a schematic diagram of a narrowband interference isolation method according to an embodiment of this application. A master communication device is connected to M slave communication devices to form a point-to-multipoint topology communication system, $M \geq 1$, and M is an integer.

S210. A master communication device determines a parameter of a narrowband interference signal.

It should be understood that an estimation algorithm of the parameter of the narrowband interference signal is not specifically limited in this application. For example, parameter estimation may be performed on the narrowband interference signal using an existing window average periodogram method.

The parameter of the narrowband interference signal may include a parameter such as bandwidth of an interference signal.

S220. The master network device determines a coefficient of a first filter based on the parameter of the narrowband interference signal.

The first filter is a filter located at a digital receive end of the master communication device, and the coefficient of the first filter is adjustable. The master communication device may adjust the coefficient of the first filter based on different received interference signals, so that a specific interference signal can be filtered out pertinently.

In this embodiment, the master communication device adjusts the coefficient of the first filter based on the parameter that is of the narrowband interference signal and that is determined in S210, and then applies the first filter after the coefficient adjustment to the digital receive end of the master communication device. The master communication device may filter out a narrowband interference signal at a specific frequency (that is, the narrowband interference signal on which the parameter estimation is performed and that is in S210) using the first filter after the coefficient adjustment.

It should be understood that a type of the first filter is not specifically limited in this application, provided that the filter can filter a narrowband signal. For example, the first filter may be a band-rejection filter or a notching (notching) filter. If the first filter is a band-rejection filter, the master communication device may adjust suppression bandwidth (that is, an example of the coefficient of the first filter) of the first filter based on bandwidth (that is, an example of the parameter of the narrowband interference signal) of the narrowband interference signal, to filter out the narrowband interference signal.

S230. The master network device sends the parameter of the interference signal or the coefficient of the first filter to the M slave communication devices using an Ethernet OAM frame. It should be understood that a master-slave (namely, master-slave) relationship in this application is similar to a process-thread relationship. Only one master communication device serves as a master, and a plurality of slave communication devices serve as slaves. The master communication device and the plurality of slave communication devices simultaneously run to form a cluster. The master serves as a task scheduler to allocate tasks to the plurality of slaves. After all the slaves complete the tasks, the slaves finally collect results to the master.

Correspondingly, the M slave communication devices receive the parameter of the narrowband interference signal or the coefficient of the first filter using the Ethernet OAM frame. M≥1, and M is an integer.

Optionally, the master network device may send the parameter of the narrowband interference signal or the coefficient of the first filter to the M slave communication devices using a user-defined message (message) field in the OAM frame.

S240. The slave communication device determines a coefficient of a second filter based on the parameter of the narrowband interference signal or the coefficient of the first filter.

The M slave communication devices include a slave communication device #1 to a slave communication device #M. The M slave communication devices need to respectively adjust one or more coefficients of M second filters based on information received from the OAM frame. The M slave communication devices are in a one-to-one correspondence with the M second filters. The slave communication device #1 is used as an example. The slave communication device #1 determines, using the parameter of the narrowband interference signal or the coefficient of the first filter, a coefficient of a second filter corresponding to the slave communication device #1, and then applies the second filter after the coefficient adjustment to a receive end of the slave communication device #1. A process of constructing a filter by another slave communication device is the same as that of the slave communication device #1, and details are not described herein again.

In the foregoing technical solution, the master communication device sends the parameter of the narrowband interference signal or the coefficient of the first filter to the plurality of slave communication devices using an interaction capability specific to the Ethernet OAM frame. In this way, the plurality of slave communication devices can adjust, based on the received information, a coefficient of a filter corresponding to each of the plurality of slave communication devices, to filter out the specific narrowband interference signal. The plurality of slave communication devices do not need to repeatedly perform interference estimation, so that storage space and calculation power of the slave communication devices are saved.

In addition, the master communication device and the slave communication device construct, at the digital receive end, a filter that can filter out the narrowband interference signal at the specific frequency, so that communication quality of a link between the master communication device and the slave communication device can be ensured in a case of strong narrowband interference.

Figure 3A:
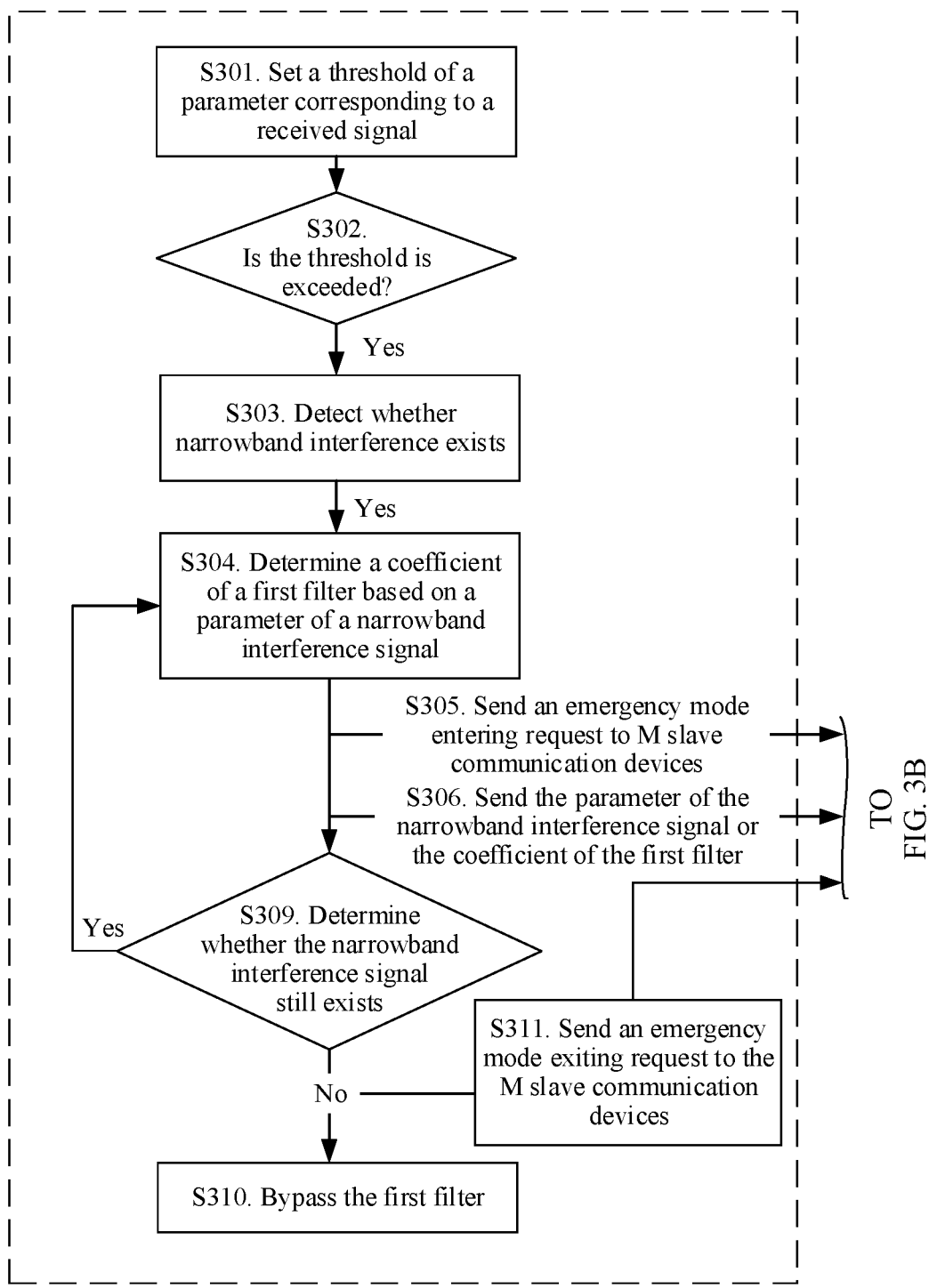
FIG. 3A and FIG. 3B are a schematic flowchart of another narrowband interference isolation method according to an embodiment of this application.
Figure 3B:
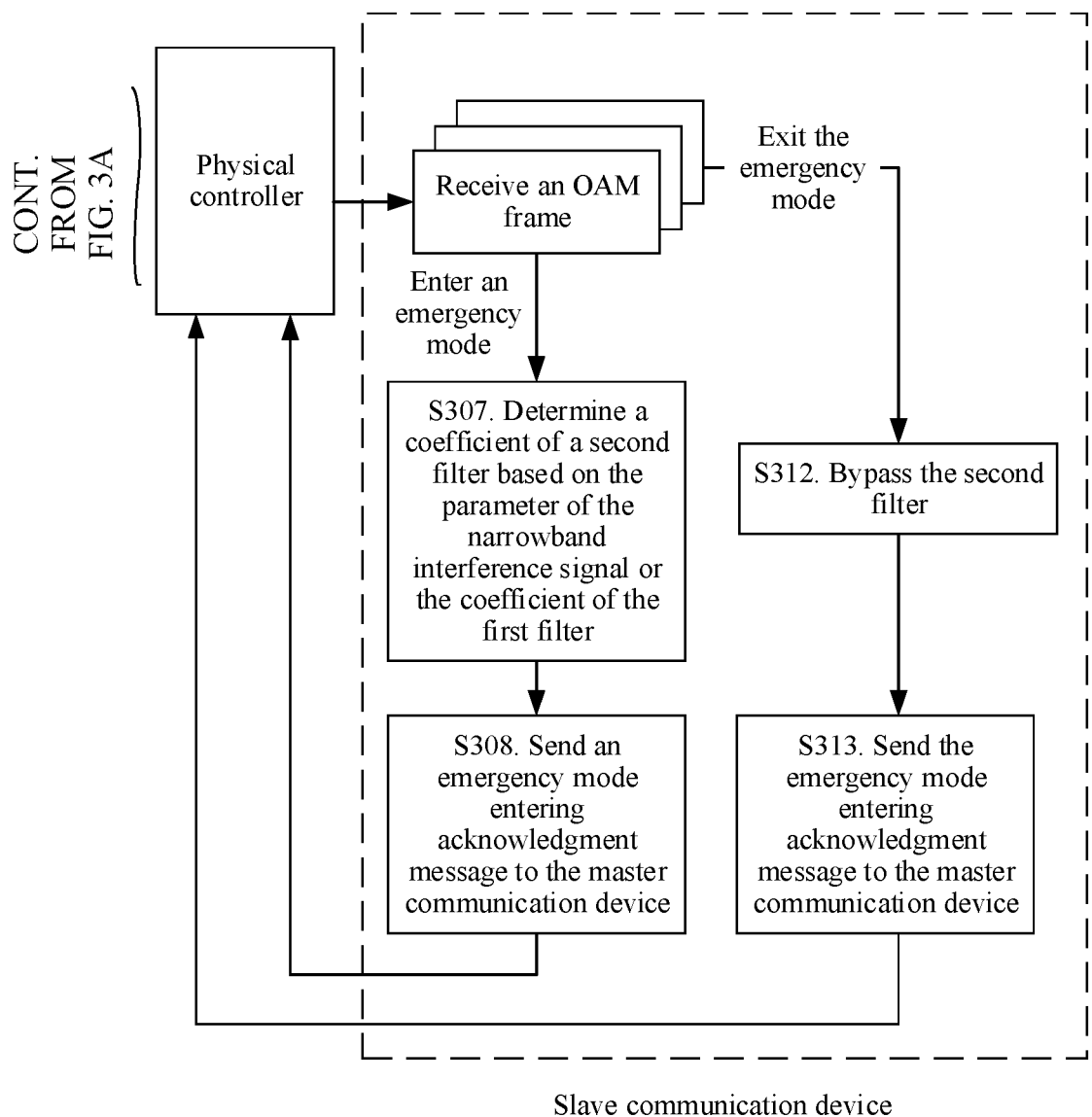

FIG. 3A and FIG. 3B are a schematic flowchart of another narrowband interference isolation method according to an embodiment of this application. A master communication device is connected to M slave communication devices to form a point-to-multipoint topology communication system, M≥1, and M is an integer.

S301. The master communication device sets a threshold of a parameter corresponding to a received signal.

For example, the parameter corresponding to the received signal includes a BER or an SNR.

Optionally, a threshold of the BER or the SNR is configured in a protocol predefining manner.

Optionally, a threshold of the BER or the SNR is configured by a user.

S302. The master communication device detects whether the parameter of the received signal exceeds the set threshold.

By way of example and not limitation, the parameter, that is, the BER, is used as an example for description in subsequent steps.

If the BER of the received signal exceeds the set threshold, the master communication device enters an emergency mode, and performs step 303.

If the BER of the received signal does not exceed the set threshold, the received signal is processed based on an existing signal processing method. Details are not described in this application.

The following describes step 302 using an example with reference to FIG. 4 and FIG. 5.

(a) in FIG. 4 is a power spectral density (power spectral density, PSD) simulation drawing obtained when narrowband interference does not exist in a received signal of a vehicle. (b) in FIG. 4 is an eye diagram obtained through decision feedback equalizer (decision feedback equalizer, DFE) equalization when narrowband interference does not exist in a received signal of a vehicle. Based on a PSD simulation result in (a) in FIG. 4, it can be obtained through calculation that SNR1=22.64 dB in this case. Based on a simulation result of the eye diagram obtained through the equalization in (b) in FIG. 4, it can be obtained through calculation that BER1=0 in this case. The threshold of the BER is set to $1*e^{-5}$.

It is assumed that the vehicle passes an FM broadcast station. When high-power narrowband interference with a center frequency of 100 MHz exists, refer to FIG. 5. (a) in FIG. 5 is a PSD simulation drawing that is of a received signal and that is obtained when narrowband interference with a center frequency of 100 MHz exists in the received signal of a vehicle. (b) in FIG. 5 is an eye diagram that is of a received signal and that is obtained through DFE equalization when narrowband interference with a center frequency of 100 MHz exists in the received signal of a vehicle. It can be clearly learned from comparison between (a) in FIG. 4 and (a) in FIG. 5 that, nearby PSD rises sharply on the frequency of 100 MHz. Based on a PSD simulation result in (a) in FIG. 5, it can be obtained through calculation that SNR2=18.15 dB in this case. Based on a simulation result of the eye diagram obtained through the equalization in (b) in FIG. 5, it can be obtained through calculation that BER2=$4.2*e^{-4}$ in this case. BER2 exceeds the preset threshold of the BER, and the master communication device enters the emergency mode.

With reference to FIG. 4 and FIG. 5, it can be learned that, when a narrowband interference signal with a center frequency of 100 MHz appears, the SNR decreases from SNR1 of 22.64 dB to SNR2 of 18.15 dB, causing a decrease of 4.5 dB, and the BER increases from BER1 of 0 to BER2 of $4.2*e^{-4}$. BER2 exceeds the preset threshold of $1*e^{-5}$, and the master communication device enters the emergency mode. The emergency mode means that the master communication device and the M slave communication devices determine to use a filter with a same parameter, to filter out a same interference signal.

It should be understood that any type of interference signal may cause the BER of the received signal of the master communication device to exceed the set threshold of the BER, causing the master communication device to enter the emergency mode. FIG. 4 and FIG. 5 merely use a narrowband interference signal as an example for description. For example, when a wideband interference signal exists, the BER of the received signal of the master communication device may be also caused to exceed the threshold, causing the master communication device to enter the emergency mode.

S303. The master communication device determines whether narrowband interference exists.

If the narrowband interference signal exists in the received signal, the master network device estimates a parameter of the narrowband interference signal, and performs S304.

It should be understood that an estimation algorithm of the parameter of the narrowband interference signal is not specifically limited in this application. For example, parameter estimation may be performed using a window average periodogram method.

If the narrowband interference signal does not exist in the received signal, a corresponding interference signal is canceled using another wideband interference method other than the method of this application.

S304. The master communication device determines a coefficient of a first filter based on the parameter of the narrowband interference signal.

The first filter is located at a receive end (Rx) digital front end of the master network device, that is, the first filter is a digital filter, and filters out, at the Rx digital front end, a narrowband interference signal at a specific frequency. In this embodiment, the digital filter performs an addition and multiplication operation on a discrete signal, and changes a signal spectrum through a digital domain operation. For example, the first filter includes a band-rejection filter or a notching (notching) filter. A form of the first filter is not specifically limited in this application.

S305. The master communication device sends an emergency mode entering request to the M slave communication devices using an OAM frame.

Correspondingly, the M slave communication devices receive the emergency mode entering request using the OAM frame. The master communication device is connected to the M slave communication devices, M≥1, and M is a positive integer.

For example, the master network device may send the emergency mode entering request to the M slave communication devices using one reserved bit B1 (that is, an example of a first bit) in an Ethernet operation, administration and maintenance (operation administration and maintenance, OAM) frame. For example, when B1=1, it indicates that the master network device requests the M slave communication devices that the master network device and the M slave communication devices enter the emergency mode; or when B1=0, it indicates that the master network device requests the M slave communication devices that the master network device and the M slave communication devices exit the emergency mode; and vice versa.

It should be noted that in this embodiment of this application, the OAM frame used by the master communication device to interact with the M slave communication devices may be a plurality of consecutive or nonconsecutive OAM frames.

It should be understood that a sequence of performing S304 and S305 is not specifically limited in this embodiment. For example, S304 may be performed first, S305 may be performed first, or S304 and S305 are performed simultaneously.

S306. The master communication device sends the parameter of the narrowband interference signal or the coefficient of the first filter to the M slave communication devices using the OAM frame.

Correspondingly, the M slave communication devices receive the parameter of the narrowband interference signal or the coefficient of the first filter using the OAM frame.

For example, the master communication device sends a quantized parameter of the narrowband interference signal to the M slave communication devices using a user-defined message (message) field in OAM frame.

It should be noted that when there are a plurality of narrowband interference signals with different center frequencies at a same time, the master communication device may send, to the slave communication device using a plurality of OAM frames, a plurality of sets of interference signal parameters corresponding to the plurality of narrowband interference signals with the different center frequencies, and the master communication device constructs, based on the plurality of sets of parameters, a plurality of cascade filters.

S307. The slave communication device determines a coefficient of a second filter based on the parameter of the narrowband interference signal or the coefficient of the first filter.

The second filter is located at a receive end (Rx) digital front end of the slave communication device, that is, the second filter is a digital filter, and filters out, at the Rx digital front end, the narrowband interference signal with the specific frequency. For example, the second filter includes a band-rejection filter or a notching (notching) filter. A form of the second filter is not specifically limited in this application.

For example, in this application, one (for example, a slave communication device #1) of the M slave communication devices is used as an example to describe steps performed by the slave communication device. An execution process of remaining M−1 slave communication devices is the same as that of the slave communication device #1. Details are not described.

Optionally, if the master communication device sends the narrowband interference signal, the slave communication device #1 determines the coefficient of the second filter based on the parameter of the narrowband interference signal in the received OAM frame.

Optionally, if the master communication device sends the coefficient of the first filter, the slave communication device #1 determines the coefficient of the second filter based on the coefficient of the first filter in the received OAM frame.

It should be noted that when the slave communication device receives a plurality of sets of interference signal parameters, the slave communication device needs to construct, based on the plurality of sets of parameters, a plurality of cascade filters.

The following describes step S307 using an example with reference to FIG. 6 to FIG. 9.

FIG. 6 is simulation drawings of an amplitude-frequency response and a phase-frequency response of an IIR filter.

(a) in FIG. 7 is a PSD simulation result of an output signal obtained after a received signal passes through an IIR filter. (b) in FIG. 7 is a simulation result of an eye diagram obtained through equalization after a received signal passes through an IIR filter. The IIR filter may also be referred to as a recursive filter.

For example, the slave communication device #1 generates a double second order infinite impulse response (infinite impulse response, IIR) notching filter (that is, the second filter corresponding to the slave communication device #1) before the DFE at the digital front end based on the parameter of the narrowband interference signal or the coefficient of the first filter. An amplitude-frequency response and a phase-frequency response of the filter are shown in FIG. 6. After a received signal with high-power narrowband interference and with a center frequency of 100 MHz passes through the filter, a PSD of the output signal and the eye diagram obtained through the equalization are shown in (a) in FIG. 7 and (b) in FIG. 7. Based on the PSD simulation result in (a) in FIG. 7, it can be obtained through calculation that SNR3=19.47 dB in this case. Based on the simulation result of the eye diagram obtained through the equalization in (b) in FIG. 7, it can be obtained through calculation that BER3=6.0526*$e^{-5}$ in this case.

A form of the filter is not limited in this application. Optionally, the second filter may be alternatively a finite impulse response (finite impulse response, FIR) filter. For a digital FIR filter, a higher order indicates a better notching effect. The FIR filter may also be referred to as a non-recursive filter.

FIG. 8 is simulation drawings of an amplitude-frequency response and a phase-frequency response of an FIR filter.

(a) in FIG. 9 is a PSD simulation result of an output signal obtained after a received signal passes through an FIR filter. (b) in FIG. 9 is a simulation result of an eye diagram obtained through equalization after a received signal passes through an FIR filter.

For example, the slave communication device #1 generates an FIR notching filter (that is, the second filter corresponding to the slave communication device #1) before the DFE equalizer at the digital front end based on the parameter of the narrowband interference signal or the coefficient of the first filter. An amplitude-frequency response and a phase-frequency response of the filter are shown in FIG. 8.

After a received signal with high-power narrowband interference and with a center frequency of 100 MHz passes through the filter, a PSD of the output signal and the eye diagram obtained through the equalization are shown in (a) in FIG. 9 and (b) in FIG. 9. Based on the PSD simulation result in (a) in FIG. 9, it can be obtained through calculation that SNR4=20.20 dB in this case. Based on the simulation result of the eye diagram obtained through the equalization in (b) in FIG. 9, it can be obtained through calculation that BER4=0 in this case.

With reference to FIG. 8, it can be learned that, when a digital IIR filter is constructed, the SNR increases from SNR2 of 18.15 dB to SNR3 of 19.47 dB, that is, increases by 1.32 dB, and the BER increases from BER2 of 4.2*$e^{-4}$ to BER3 of 6.0526*$e^{-5}$.

With reference to FIG. 9, it can be learned that, when a digital FIR filter is constructed, the SNR increases from SNR2 of 18.15 dB to SNR4 of 20.20 dB, that is, increases by 2.05 dB, and the BER decreases from BER2 of 4.2*$e^{-4}$ to BER4 of 0. In this case, BER4 falls below the preset threshold 1*$e^{-5}$.

S308. The slave communication device sends an emergency mode entering acknowledgment message to the master communication device using the OAM frame.

Correspondingly, the master communication device receives the emergency mode entering acknowledgment message using the OAM frame.

For example, the slave communication device #1 sends the emergency mode entering acknowledgment message to the master communication device based on another reserved bit B2 (that is, an example of a second bit) in the OAM frame. For example, when B2=1, it indicates that the slave communication device #1 successfully enters the emergency mode; or when B2=0, it indicates that the slave communication device #1 fails to enter the emergency mode; and vice versa.

It should be understood that, in a future Ethernet communication system, if the OAM frame has other bits the same as or similar to the reserved bits B1 and B2, the other bits may also be for replacing the reserved bits B1 and B2 in this application. This is not specifically limited in this application.

S309. The master communication device determines whether the narrowband interference signal still exists.

The master communication device continuously monitors an input signal A (that is, an example of a first input signal) and an output signal A' (that is, an example of a first output signal) that pass through the first filter, where the output signal A' is an output signal obtained after the input signal A passes through the first filter, and calculates a difference between the input signal A and the output signal A' to determine whether the narrowband interference signal still exists. For example, a threshold X may be preset. When the difference between the input signal and the output signal is less than or equal to the preset threshold X, it may be considered that the narrowband interference signal does not exist. When the difference between the input signal and the output signal is greater than the preset threshold X, it may be considered that the narrowband interference signal still exists.

If the narrowband interference signal still exists, the first filter in S304 continues to be used to filter a subsequent received signal (that is, an example of a second input signal).

If the narrowband interference signal does not exist, S310 and S311 are performed.

It should be noted that S310 and S311 are not performed in sequence. S310 may be performed first, S311 may be performed first, or S310 and S311 are performed simultaneously.

S310. The master communication device bypasses (bypass) the first filter. To be specific, the master communication device does not filter the subsequent received signal using the first filter.

S311. The master communication device sends an emergency mode exiting request to the M slave communication devices using the OAM frame.

Correspondingly, the M slave communication devices receive the emergency mode exiting request using the OAM frame.

For example, the master network device may send the emergency mode exiting request to the M slave communication devices using the reserved bit B1. It should be noted that, if when B1=1, it indicates that the master network device requests the M slave communication devices that the master network device and the M slave communication devices enter the emergency mode in step 305, when B1=0, it indicates that the master network device requests the M slave communication devices that the master network device and the M slave communication devices exit the emergency mode; or if when B1=1, it indicates that the master network device requests the M slave communication devices that the master network device and the M slave communication devices enter the emergency mode in S305, when B1=0, it indicates that the master network device requests the M slave communication devices that master network device and the M slave communication devices exit the emergency mode.

S312. The slave communication device bypasses (bypass) the second filter.

For example, the slave communication device #1 bypasses, based on the emergency mode exiting request, the second filter corresponding to the slave communication device #1, to be specific, a signal received by the slave communication device is not filtered by the second filter any more.

S313. The slave communication device sends an emergency mode exiting acknowledgment message to the master communication device using the OAM frame.

Correspondingly, the master communication device receives the emergency mode exiting acknowledgment message using the OAM frame.

For example, the slave communication device #1 sends the emergency mode exiting acknowledgment message to the master communication device using the reserved bit B2. It should be noted that, for example, when B2=1, it indicates that the slave communication device #1 successfully exits the emergency mode; or when B2=0, it indicates that the slave communication device #1 fails to exit the emergency mode; and vice versa.

In the foregoing technical solution, using an interaction capability of the Ethernet OAM frame, the master communication device delivers a calculated narrowband interference parameter or filter coefficient to all slave communication devices, and the slave communication devices each construct a narrowband filter based on interaction information. In this way, the plurality of slave communication devices do not need to repeatedly perform narrowband interference estimation, so that storage space and calculation power of the slave communication devices are saved.

In addition, the foregoing filtering is performed at the digital front end, and a structure of a simulation front end does not need to be changed. Narrowband filtering is performed before the DFE equalizer, a DFE coefficient does not need to be changed either, and the filter coefficient may be flexibly adjusted based on an interference monitoring result.

The foregoing describes in detail the narrowband interference isolation method provided in this application. The following describes a communication apparatus provided in this application.

FIG. 10 is a schematic block diagram of a communication apparatus 1000 according to this application. As shown in FIG. 10, the communication apparatus 1000 includes a receiving unit 1100, a sending unit 1200, and a processing unit 1300.

The processing unit 1300 is configured to determine a parameter of a narrowband interference signal. The processing unit 1300 is further configured to determine a coefficient of a first filter based on the parameter of the narrowband interference signal, where the first filter is located at a receive end of a master communication device, and the coefficient of the first filter is for filtering out the narrowband interference signal. The sending unit 1200 is configured to send the parameter of the narrowband interference signal or the coefficient of the first filter to M slave communication devices using an OAM frame, where the master communication device is connected to the M slave communication devices, M≥1, and M is an integer.

Optionally, in an embodiment, before the sending unit 1200 sends the parameter of the narrowband interference signal or the coefficient of the first filter to the M slave communication devices, the sending unit 1200 is further configured to send an emergency mode entering request message to the M slave communication devices using a first bit in the OAM frame, where the first bit is a reserved bit in the OAM frame.

Optionally, in another embodiment, the receiving unit 1100 is configured to receive, using a second bit in the OAM frame, an emergency mode entering acknowledgment message sent by the M slave communication devices.

Optionally, in another embodiment, the processing unit 1300 is further configured to calculate a difference between a first input signal and a first output signal that pass through the first filter. The processing unit 1300 is further configured to determine, based on the difference, whether the narrowband interference signal still exists. When the narrowband interference signal exists, the processing unit 1300 is further configured to filter, using the first filter, a second input signal that is received; or when the narrowband interference signal does not exist, the processing unit 1300 is further configured to not to filter, using the first filter, a second input signal that is received, where the second input signal is a signal received after the first input signal is received.

Optionally, in another embodiment, when the narrowband interference signal does not exist, the sending unit 1200 is further configured to send an emergency mode exiting request message to the M slave communication devices using the first bit in the OAM frame.

Optionally, in another embodiment, the sending unit 1200 is further configured to receive, using the second bit in the OAM frame, an emergency mode exiting acknowledgment message sent by the M slave communication devices, where the second bit is another reserved bit different from the first bit in the OAM frame.

Optionally, the receiving unit 1100 and the sending unit 1200 may be integrated into a transceiver unit that has both receiving and sending functions. This is not limited herein.

In an implementation, the communication apparatus 1000 may be the master communication device (for example, a gateway in a vehicle-mounted system) in the method embodiments. In this implementation, the receiving unit 1100 may be a receiver, and the sending unit 1200 may be a transmitter. Alternatively, the receiver and the transmitter may be integrated into a transceiver.

In another implementation, the communication apparatus 1000 may be a chip or an integrated circuit installed in the master communication device. In this implementation, the receiving unit 1100 and the sending unit 1200 may be a communication interface or an interface circuit. For example, the receiving unit 1100 is an input interface or an input circuit, and the sending unit 1200 is an output interface or an output circuit.

The processing unit 1300 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 1000 performs the operations and/or processing performed by the master communication device in the method embodiments.

Optionally, the processing apparatus may include only the processor, and the memory configured to store the computer program is located outside the processing apparatus. The processor is connected to the memory through a circuit/wire, to read and execute the computer program stored in the memory. Optionally, in some examples, the processing apparatus may alternatively be a chip or an integrated circuit.

FIG. 11 is a schematic block diagram of a communication apparatus 2000 according to this application. As shown in FIG. 11, the communication apparatus 2000 includes a receiving unit 2100, a sending unit 2200, and a processing unit 2300.

The receiving unit 2100 is configured to receive a parameter of a narrowband interference signal or a coefficient of a first filter from a master communication device using an Ethernet operation, administration, and maintenance OAM frame, where the coefficient of the first filter is determined by the master communication device based on the parameter of the narrowband interference signal, the coefficient of the first filter is for filtering out the narrowband interference signal, the master communication device is connected to M slave communication devices configured with the apparatus, M≥1, and M is an integer. The processing unit 2300 is configured to determine a coefficient of a second filter based on the parameter of the narrowband interference signal or the coefficient of the first filter, where the second filter is located at a receive end of the slave communication device, and the coefficient of the second filter is for filtering out the narrowband interference signal.

Optionally, in an embodiment, before the receiving unit 2100 receives the parameter of the narrowband interference signal or the coefficient of the first filter from the master communication device, the receiving unit 2100 is further configured to receive, using a first bit in the OAM frame, an emergency mode entering request message sent by the master communication device, where the first bit is a reserved bit in the OAM frame.

Optionally, in another embodiment, the sending unit 2200 is configured to send an emergency mode entering acknowledgment message to the master communication device using a second bit in the OAM frame, where the second bit is another reserved bit different from the first bit in the OAM frame.

Optionally, in another embodiment, the receiving unit 2100 is further configured to receive, using the first bit in the OAM frame, an emergency mode exiting request message sent by the master communication device; and the processing unit 2300 is further configured to not to filter, based on the emergency mode exiting request message using the second filter, an input signal received after the emergency mode exiting request message is received.

Optionally, in another embodiment, the sending unit 2200 is further configured to send an emergency mode exiting acknowledgment message using the second bit in the OAM frame.

Optionally, the receiving unit 2100 and the sending unit 2200 may be integrated into a transceiver unit that has both receiving and sending functions. This is not limited herein.

In an implementation, the communication apparatus 2000 may be the slave communication device (for example, vehicle-mounted radar) in the method embodiments. In this implementation, the sending unit 2200 may be a transmitter, and the receiving unit 2100 may be a receiver. Alternatively, the receiver and the transmitter may be integrated into a transceiver. The processing unit 2300 may be a processing apparatus.

In another implementation, the communication apparatus 2000 may be a chip or an integrated circuit installed in the slave communication device. In this implementation, the receiving unit 2100 and the sending unit 2200 may be a communication interface or an interface circuit. For example, the sending unit 2200 is an output interface or an output circuit, the receiving unit 2100 is an input interface or an input circuit. The processing unit 2300 may be a processing apparatus.

A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 2000 performs the operations and/or processing performed by the slave communication device in the method embodiments. Optionally, the processing apparatus may include only the processor, and the memory configured to store the computer program is located outside the processing apparatus. The processor is connected to the memory through a circuit/wire, to read and execute the computer program stored in the memory. Optionally, in some examples, the processing apparatus may alternatively be a chip or an integrated circuit.

FIG. 12 is a schematic diagram of a structure of a communication apparatus 10 according to this application. As shown in FIG. 12, the communication apparatus 10 includes one or more processors 11, one or more memories 12, and one or more communication interfaces 13. The processor 11 is configured to control the communication interface 13 to transmit and receive a signal. The memory 12 is configured to store a computer program. The processor 11 is configured to invoke the computer program from the memory 12 and run the computer program, so that the procedures and/or operations performed by the master communication device in the method embodiments of this application are performed.

For example, the processor 11 may have a function of the processing unit 1300 shown in FIG. 10, and the communication interface 13 may have a function of the sending unit 1200 and/or the receiving unit 1100 shown in FIG. 10. Specifically, the processor 11 may be configured to perform the processing or operations internally performed by the master communication device in FIG. 2 and FIG. 3A and FIG. 3B, and the communication interface 13 is configured to perform sending and/or receiving actions performed by the master communication device in FIG. 2 and FIG. 3A and FIG. 3B.

In an implementation, the communication apparatus 10 may be the master communication device (for example, vehicle-mounted radar) in the method embodiments. In this implementation, the communication interface 13 may be a transceiver. The transceiver may include a receiver and a transmitter. Optionally, the processor 11 may be a baseband apparatus, and the communication interface 13 may be a radio frequency apparatus. In another implementation, the communication apparatus 10 may be a chip or an integrated circuit installed in the master communication device. In this implementation, the communication interface 13 may be an interface circuit or an input/output interface.

FIG. 13 is a schematic diagram of a structure of a communication apparatus 20 according to this application. As shown in FIG. 13, the communication apparatus 20 includes one or more processors 21, one or more memories 22, and one or more communication interfaces 23. The processor 21 is configured to control the communication interface 23 to transmit and receive a signal. The memory 22 is configured to store a computer program. The processor 21 is configured to invoke the computer program from the memory 22 and run the computer program, so that the procedures and/or operations performed by the slave communication device in the method embodiments of this application are performed.

For example, the processor 21 may have a function of the processing unit 2300 shown in FIG. 11, and the communication interface 23 may have a function of the sending unit 2200 and/or the receiving unit 2100 shown in FIG. 11. Specifically, the processor 21 may be configured to perform the processing or operations internally performed by the slave communication device in FIG. 2 and FIG. 3A and FIG. 3B, and the communication interface 33 is configured to perform sending and/or receiving actions performed by the slave communication device in FIG. 2 and FIG. 3A and FIG. 3B.

In an implementation, the communication apparatus 20 may be the slave communication device (for example, vehicle-mounted radar) in the method embodiments. In this implementation, the communication interface 23 may be a transceiver. The transceiver may include a receiver and a transmitter. Optionally, the processor 21 may be a baseband apparatus, and the communication interface 23 may be a radio frequency apparatus. In another implementation, the communication apparatus 20 may be a chip or an integrated circuit installed in the slave communication device. In this implementation, the communication interface 23 may be an interface circuit or an input/output interface.

Optionally, the memory and the processor in the foregoing apparatus embodiments may be physically independent units, or the memory may be integrated with the processor. This is not limited in this specification.

In addition, this application further provides a computer-readable storage medium. The computer-readable storage medium stores computer instructions. When the computer instructions are run on a computer, the operations and/or procedures performed by the master communication device in the method embodiments of this application are performed.

In addition, this application further provides a computer-readable storage medium. The computer-readable storage medium stores computer instructions. When the computer instructions are run on a computer, the operations and/or procedures performed by the slave communication device in the method embodiments of this application are performed.

In addition, this application further provides a computer program product. The computer program product includes computer program code or instructions. When the computer program code or the instructions are run on a computer, the operations and/or procedures performed by the master communication device in the method embodiments of this application are performed.

This application further provides a computer program product. The computer program product includes computer program code or instructions. When the computer program code or the instructions are run on a computer, the operations and/or procedures performed by the slave communication device in the method embodiments of this application are performed.

In addition, this application further provides a chip. The chip includes a processor. A memory configured to store a computer program is disposed independent of the chip. The processor is configured to execute the computer program stored in the memory, so that the operations and/or processing performed by the master communication device in any method embodiment are/is performed.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, so that the operation and/or processing performed by the slave communication device in any method embodiment are/is performed.

Further, the chip may include a communication interface. The communication interface may be an input/output interface, an interface circuit, or the like. Further, the chip may include the memory.

In addition, this application further provides a communication apparatus (where for example, the communication apparatus may be a chip), including a processor and a communication interface. The communication interface is configured to receive a signal and transmit the signal to the processor. The processor processes the signal, so that the operation and/or processing performed by the master communication device in any method embodiment are/is performed.

This application further provides a communication apparatus (where for example, the communication apparatus may be a chip), including a processor and a communication interface. The communication interface is configured to receive a signal and transmit the signal to the processor. The processor processes the signal, so that the operation and/or processing performed by the slave communication device in any method embodiment are/is performed.

In addition, this application further provides a communication apparatus, including at least one processor. The at least one processor is coupled to at least one memory, and the at least one processor is configured to execute a computer program or instructions stored in the at least one memory, so that the operation and/or processing performed by the master communication device in any method embodiment are/is performed.

This application further provides a communication apparatus, including at least one processor. The at least one processor is coupled to at least one memory, and the at least one processor is configured to execute a computer program or instructions stored in the at least one memory, so that the operation and/or processing performed by the slave communication device in any method embodiment are/is performed.

In addition, this application further provides a master communication device, including a processor, a memory, and a transceiver. The memory is configured to store a computer program. The processor is configured to invoke and run the computer program stored in the memory, and control the transceiver to transmit and receive a signal, so that the master communication device performs the operation and/or processing performed by the master communication device in any method embodiment.

This application further provides a slave communication device, including a processor, a memory, and a transceiver. The memory is configured to store a computer program. The processor is configured to invoke and run the computer program stored in the memory, and control the transceiver to transmit and receive a signal, so that the slave communication device performs the operation and/or processing performed by the slave communication device in any method embodiment.

In addition, this application further provides a communication system, including the master communication device and the slave communication device in embodiments of this application.

The processor in embodiments of this application may be an integrated circuit chip, and has a signal processing capability. In an implementation process, the steps in the foregoing method embodiments may be implemented using a hardware integrated logical circuit in the processor or instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The general-purpose processor may be a microprocessor, or the processor may be any conventional processor or the like. The steps of the method disclosed with reference to embodiments of this application may be directly performed by a hardware encoding processor, or may be performed using a combination of hardware and software modules in an encoding processor. The software module may be located in a mature storage medium in the art, for example, a random access memory, a flash memory, a read-only memory, a programmable read-only memory, an electrically erasable programmable memory, or a register. The storage medium is located in the memory. The processor reads information in the memory and completes the steps in the foregoing methods in combination with hardware of the processor.

The memory in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the system and the methods described in this specification is intended to include, but not limited to, these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

In this application, a term "and/or" merely describes an association relationship between associated objects and indicates that three relationships may exist. For example, A and/or B may indicate the following three cases: Only A exists, both A and B exist, and only B exists. A, B, and C each may be a singular number or a plural number. This is not limited.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium such as a USB flash drive, a removable hard disk, a ROM, a RAM, a magnetic disk, or an optical disc that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A narrowband interference isolation method, comprising:
   determining a parameter of a narrowband interference signal;
   determining, by a master communication device, a coefficient of a first filter based on the parameter of the narrowband interference signal, wherein the first filter is located at a receive end of the master communication device, and the coefficient of the first filter is for filtering out the narrowband interference signal; and
   sending, by the master communication device, the parameter of the narrowband interference signal or the coefficient of the first filter to M slave communication devices using an Ethernet operation, administration, and maintenance (OAM) frame, wherein the master communication device is connected to the M slave communication devices, and M is an integer that is greater than 1.

2. The method according to claim 1, wherein before the sending the parameter of the narrowband interference signal or the coefficient of the first filter to M slave communication devices, the method further comprises:
   sending an emergency mode entering request message to the M slave communication devices using a first bit in the OAM frame, wherein the first bit is a reserved bit in the OAM frame.

3. The method according to claim 2, wherein the method further comprises:
   receiving, using a second bit in the OAM frame, an emergency mode entering acknowledgment message sent by the M slave communication devices, wherein the second bit is another reserved bit different from the first bit in the OAM frame.

4. The method according to claim 3, wherein the method further comprises:
   calculating a difference between a first input signal and a first output signal that pass through the first filter;
   determining, based on the difference, whether the narrowband interference signal still exists; and
   perform one of the following:
       when the narrowband interference signal exists, filtering, using the first filter, a second input signal that is received; or
       when the narrowband interference signal does not exist, skipping filtering, using the first filter, a second input signal that is received, wherein
   the second input signal is a signal received after the first input signal is received.

5. The method according to claim 4, wherein when the narrowband interference signal does not exist, the method further comprises:
   sending an emergency mode exiting request message to the M slave communication devices using the first bit in the OAM frame.

6. The method according to claim 5, wherein the method further comprises:
   receiving, using the second bit in the OAM frame, an emergency mode exiting acknowledgment message sent by the M slave communication devices.

7. A narrowband interference isolation method, comprising:
   receiving, by a slave communication device and from a master communication device, a parameter of a narrowband interference signal or a coefficient of a first filter from a master communication device using an Ethernet operation, administration, and maintenance (OAM) frame, wherein the coefficient of the first filter is for filtering out the narrowband interference signal, the master communication device is connected to M slave communication devices, the slave communication device is one of the M slave communication devices, and M is an integer that is greater than 1; and
   determining a coefficient of a second filter based on the parameter of the narrowband interference signal or the coefficient of the first filter, wherein the second filter is located at a receive end of the slave communication device, and the coefficient of the second filter is for filtering out the narrowband interference signal.

8. The method according to claim 7, wherein before the receiving, by a slave communication device and from a master communication device, a parameter of a narrowband interference signal or a coefficient of a first filter from a master communication device, the method further comprises:
   receiving, using a first bit in the OAM frame, an emergency mode entering request message sent by the master communication device, wherein the first bit is a reserved bit in the OAM frame.

9. The method according to claim 8, wherein the method further comprises:
   sending an emergency mode entering acknowledgment message to the master communication device using a second bit in the OAM frame, wherein the second bit is another reserved bit different from the first bit in the OAM frame.

10. The method according to claim 9, wherein the method further comprises:
   receiving, using the first bit in the OAM frame, an emergency mode exiting request message sent by the master communication device; and
   skipping filtering, based on the emergency mode exiting request message using the second filter, an input signal received after the emergency mode exiting request message is received.

11. The method according to claim 10, wherein the method further comprises:
sending an emergency mode exiting acknowledgment message using the second bit in the OAM frame.

12. A narrowband interference isolation apparatus, comprising:
at least one processor, configured to determine a parameter of a narrowband interference signal, wherein
the at least one processor is configured to determine a coefficient of a first filter based on the parameter of the narrowband interference signal, wherein the first filter is located at a receive end of a master communication device, and the coefficient of the first filter is for filtering out the narrowband interference signal; and
an interface circuit, configured to send the parameter of the narrowband interference signal or the coefficient of the first filter to M slave communication devices using an Ethernet operation, administration, and maintenance OAM frame, wherein the master communication device is connected to the M slave communication devices, and M is an integer that is greater than 1.

13. The apparatus according to claim 12, wherein before the interface circuit sends the parameter of the narrowband interference signal or the coefficient of the first filter to the M slave communication devices, the interface circuit is further configured to send an emergency mode entering request message to the M slave communication devices using a first bit in the OAM frame, wherein the first bit is a reserved bit in the OAM frame.

14. The apparatus according to claim 13, wherein the apparatus further comprises a receiver that is configured to receive, using a second bit in the OAM frame, an emergency mode entering acknowledgment message sent by the M slave communication devices, wherein the second bit is another reserved bit different from the first bit in the OAM frame.

15. The apparatus according to claim 14, wherein the at least one processor is further configured to calculate a difference between a first input signal and a first output signal that pass through the first filter;
the at least one processor is further configured to determine, based on the difference, whether the narrowband interference signal still exists; and
perform one of the following:
when the narrowband interference signal exists, filtering, using the first filter, a second input signal received by the apparatus; or
when the narrowband interference signal does not exist, the at least one processor does not filter, using the first filter, a second input signal received by the receiver, wherein
the second input signal is a signal received after the first input signal is received.

16. The apparatus according to claim 15, wherein when the narrowband interference signal does not exist, the interface circuit is further configured to send an emergency mode exiting request message to the M slave communication devices using the first bit in the OAM frame.

17. The apparatus according to claim 16, wherein the interface circuit is configured to receive, using the second bit in the OAM frame, an emergency mode exiting acknowledgment message sent by the M slave communication devices.

\* \* \* \* \*